(12) United States Patent
Kägi et al.

(10) Patent No.: US 6,821,613 B1
(45) Date of Patent: Nov. 23, 2004

(54) STRUCTURAL COMPONENT CONSISTING OF FIBER-REINFORCED THERMOPLASTIC PLASTIC

(75) Inventors: Peter Kägi, Tann (CH); Diego Jaggi, Zürich (CH)

(73) Assignee: RCC Regional Compact Car AG (CH)

( * ) Notice: Subject to any disclaimer, the term of this patent is extended or adjusted under 35 U.S.C. 154(b) by 0 days.

(21) Appl. No.: 09/673,340
(22) PCT Filed: Apr. 14, 1999
(86) PCT No.: PCT/CH99/00150
§ 371 (c)(1), (2), (4) Date: Oct. 14, 2000
(87) PCT Pub. No.: WO99/52703
PCT Pub. Date: Oct. 21, 1999

(30) Foreign Application Priority Data

Apr. 15, 1998 (CH) ................................. 861/98

(51) Int. Cl.[7] ........................ D04H 13/00; D04H 3/00; B32B 27/12
(52) U.S. Cl. ................. 428/292.1; 428/283; 428/294.1; 428/297.4
(58) Field of Search ............................ 428/283, 292.1, 428/294.1, 297.4

(56) References Cited

U.S. PATENT DOCUMENTS

| | | | | |
|---|---|---|---|---|
| 4,098,943 A | * | 7/1978 | Degginger et al. | 428/283 |
| 4,612,238 A | * | 9/1986 | DellaVecchia et al. | 428/228 |
| 5,173,142 A | * | 12/1992 | Billiu | 156/245 |
| 5,362,431 A | * | 11/1994 | Guerrini et al. | 264/131 |
| 5,637,375 A | * | 6/1997 | Hohman | 428/113 |
| 5,792,529 A | * | 8/1998 | May | 428/36.2 |
| 5,891,560 A | * | 4/1999 | Edwards et al. | 428/295 |
| 6,106,650 A | * | 8/2000 | Cheshire | 156/229 |

* cited by examiner

*Primary Examiner*—B. Hamilton Hess
*Assistant Examiner*—Camie S Thompson
(74) *Attorney, Agent, or Firm*—Oppedahl & Larson LLP (57) ABSTRACT

A structural component of fiber-reinforced thermoplastic material has a shape-forming long-fiber-reinforced thermoplastic matrix and separate, single load-bearing plastified and consolidated continuous fiber strands with a thermoplastic matrix in a defined position within the structural component. The positions of the shape forming long-fiber-reinforced thermoplastic matrix and the separate, single load-bearing plastified and consolidated continuous fiber strands with a thermoplastic matrix define interfaces therebetween. The continuous fiber strands are interconnected and have at least one load-transmitting flat internal connecting area between two continuous fiber strands. The single continuous fiber strands form a load-bearing supporting structure which is integrated in and thermoplastically bonded to the long-fiber-reinforced thermoplastic matrix at the interfaces therebetween.

21 Claims, 8 Drawing Sheets

STRUCTURAL COMPONENT CONSISTING OF FIBER-REINFORCED THERMOPLASTIC PLASTIC

The invention concerns a structural component consisting of fibre-reinforced thermoplastic plastic as well as a method for manufacturing such a structural component and an installation for implementing this method.

Such known fibre-reinforced preformed-and structural components in general can be manufactured either with cost-effective series production methods and with only a relatively low fibre reinforcement, with which-while a broad variety of shapes is possible-load-bearing functions cannot be accomplished. Or else relatively a expensive, elaborate methods with a high proportion of continuous fibre are called for, which enable structural components for demanding load-bearing functions, whereby the forming here, however, frequently is limited, resp., would once again require an increased expenditure. With the known cost-effective manufacturing methods, short- or long-fibre-reinforced preformed components can be produced with a relatively low proportion of fibre and correspondingly limited mechanical characteristics, such as strength, rigidity, brittleness and creep behaviour. Such methods are, e.g., short-fibre injection moulding, which makes possible a very good shaping, but which as a result of the very limited fibre lengths utilizable (usually less than 3 mm) and the comparatively low proportions of reinforcing fibres, however, are mechanically still relatively weak and brittle. In the case of a further known method, the long-fibre extrusion, greater fibre lengths of over 5 mm, e.g., 10–30 mm are possible, which with a good consolidation in part make possible improved mechanical characteristics, above all also reduced thermal expansions. Various methods for the suitable corresponding-to-form feeding in of the long-fibre molten mass are known, e.g., by means of conveyor belts and blades for separating the molten mass in the mould or by means of a controlled laying device in accordance with EP 769 358.

With a corresponding-to-form feeding in, short flow paths and careful treatment of the long-fibres can be achieved. However, also with this no load-bearing structures are feasible. In particular demanding load-bearing structural components, such as, e.g., for vehicle cabins, chassis components or load-bearing body components or also for light, but stable transport containers, sports implements, etc., cannot be manufactured with this known method. In addition to the high mechanical requirements of load-bearing structural components in vehicle manufacture, apart from high strength values above all also a high creep resistance and a favourable crash characteristic with a defined adjustability and a high energy absorption are demanded. Such demanding load-bearing structural components are feasible with continuous fibre-reinforced composite components, however, they call for very elaborate, expensive manufacturing processes. These are, e.g., the squeeze moulding of plane thermoplastic continuous fibre semi-finished products (organo-sheet pressing), which, however only allows a limited shaping or else requires a once again increased effort for a more elaborate shaping. Also load-bearing structural components made of high-strength duromer composite materials can only be produced by elaborate and expensive processes, in general require relatively long cycle times and also with respect to re-cycling lead to additional problems. They are therefore not utilizable for larger series in vehicle production.

It is therefore the object of the invention presented her to overcome these limitations, resp., disadvantages of the known methods and structural components and to create a load-bearing structural component as well as a corresponding manufacturing method and to indicate an installation for the manufacture of a structural component, which can reliably fulfil demanding load-bearing functions and which structural component can be manufactured cost-effectively and in different shapes, whereby also short cyle times for a series production can be achieved. Over and above, also additional functions, such as, e.g. the introduction of forces into the structural component shall be possible.

With the invention, in essence advantageous characteristics of long-fibre compression-moulded components, which make possible a broad range of shapings, combined with the high mechanical characteristics, which form the integrated load-bearing supporting structure with at least one load-transmitting internal connecting area of the coninuous fibre strands, in that in a simple manner in one manufacturing process relatively cost-effectively and with short cycle times light and load-bearing structural-and preformed components can be made.

The dependent claims concern advantageous further developments of the invention, which for various applications make possible particular advantages with respect to producibility, mechanical characteristics, weight and manufacturing costs as well as additional functions.

In the following, the invention is further explained on the basis of embodiments and Figures. These show.

Figure 1A:
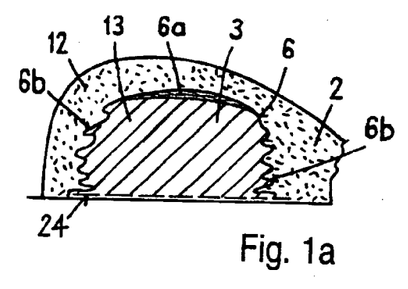
FIGS. 1*a,b* a structural component in accordance with the invention in cross-section through a continuous fibre strand and at an internal connecting area, FIGS. 2, 3 arrangements of continuous fibre strands as load-bearing structure in structural components, FIGS. 4, 5 twisted and wrapped continuous fibre strands, FIGS. 6*a, b* a load-bearing insert on a continuous fibre strand, FIG. 7 a structural component with inlays, FIGS. 8, 9 structural components with three-dimensional profile cross-sections, FIG. 10 an external connecting area, FIG. 11 a structural body formed out of several structural components, FIG. 12 a structural body, formed out of two half-shells, FIG. 13 a transport mesh with laid continuous fibre strands, FIG. 14 a structural component with two layers of continuous fibre strands, FIG. 15 a vehicle side wall with framework-like supporting structure, FIG. 16 a continuous fibre strand with an eye moulded into it, FIG. 17 a holding element at the end of a continuous fibre strand, FIG. 18 a movable fixing pin for the positioning of continuous fibre strands, FIGS. 19*a, b* installations for the manufacturing of structural components, FIGS. 20*a, b* shapings of the laying path in a form tool, FIG. 21 a thermal conditioning of a laying path, FIGS. 22*a, b, c* guiding-and pressing on means for the laying of continuous fibre strands, FIGS. 23*a, b* a connecting layer as interface with a transition zone, FIGS. 24*a, b, c* load-transmitting internal connecting areas of two continuous fibre strands, FIG. 25 a supporting structure arrangement of continuous fibre strands with fixing-and tensioning elements.
Figure 1B:
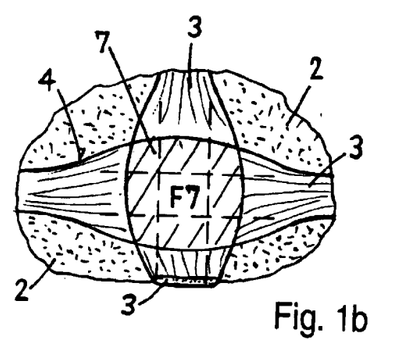

The FIGS. 1*a*, 1*b*, for example, illustrate the structure of a structural component made of fibre-reinforced thermoplastic plastic material. FIG. 1a illustrates a cross-section through a continuous fibre strand 3 and FIG. 1b shows a load-transmitting internal connecting area 7 of two continuous fibre strands. The structural component has a shaping long-fibre-reinforced thermoplastic matrix 2 and an integrated load-bearing supporting structure 4, which is formed by consolidated continuous fibre strands 3 with a thermoplastic matrix. Essential here is the fact, that the long-fibre matrix and the continuous fibre matrix are compatible with one another to such an extent, that they are fused together at their mutual contact surfaces 6 (interface), i.e., that they are thermoplastically joined. The supporting structure 4 has at least one load-transmitting internal connecting area 7 between two continuous fibre strands 3. In order to achieve particularly good connections at the interfaces, the interfaces 6 can at least in part be implemented as connecting layers 6a, which form a transmission zone between the long-fibre matrix 2 and the continuous fibre strands 3. This is further explained in the FIGS. 23a and 23b. Advantageously, the interfaces 6 for the purpose of an optimum connection and load-transmission from the continuous fibre strands to 3 the long-fibre mass 2 can also be designed as enlarged structured interfaces 6b manifesting structured uneven extrusions. This is also illustrated in the FIGS. 4, 5.

FIG. 1b illustrates a force-transmitting internal connecting area 7 between two continuous fibre strands 3, which are of decisive significance for the mechanical stability of the supporting structure 4. For a good load transmission, to do so an optimum thermoplastic connection, in preference at relatively large interfaces F7, has to be produced. To achieve this, the strands 3 at the connecting area 7 are strongly flattened and widened. Further illustrations for this are shown in the FIGS. 24a, b, c.

The continuous fibre strands 3, depending on requirements of the resulting structural component, can be utilized in various shapes, both with respect to cross-sectional shapes (round, flat, etc.), as well as with respect to their composition and surface structure. Thus, e.g., UD-fibres, prepregs, rovings and in complement fabric tapes, knitted or fibrous layers can be utilized.

Figure 2:
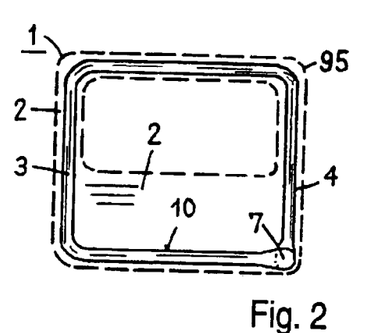
Figure 3:
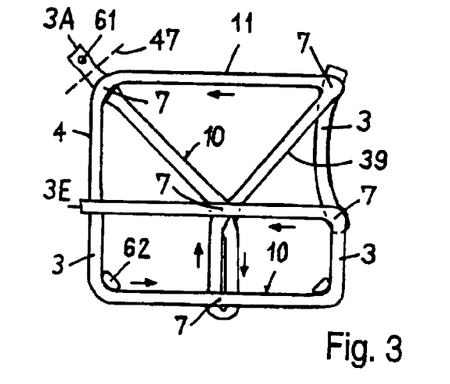

Examples of this supporting structure 4 are shown in the FIGS. 2 and 3, whereby the continuous fibre strands 3 in preference form at least one closed mesh 10 with a load-transmitting internal connection area 7. FIG. 2, as an example, illustrates a closed mesh or loop 10 as supporting structure and outer frame of a vehicle tailgate 95, the shape of which is formed by the long-fibre matrix 2.

FIG. 3 shows a supporting structure 4, in the case of which the continuous fibre strands, running in different directions, form a framework-like pattern 11 and are thermoplastically connected at internal connection areas 7. The supporting structure 4 of a structural component in doing so can be composed of a single strand, or it is possible also to utilize several strands, if so required with differing thicknesses and cross-sectional shapes. It is important, that a material connection between the long-fibre matrix 2 and the continuous fibre strands 3 is achieved, for which reason the matrix materials of the two elements in preference are identical, at least, however, compatible to such an extent, that the two materials are mixed together by means of diffusion at the interface layers 6.

Suitable as matrix materials for the long-fibre reinforcement 2 and the continuous fibre strands 3 are polypropylene (PP), polyamide (PA), polyethylenetherephtalate (PET), polybutylenetherephtalate (PBT), thermoplastic polyurethanes (PUR), polycarbonate (PC) as more cost-effective technical plastic materials for corresponding applications, while polyimides (PI), polyphenylsulphide (PPS) or polyetheretherketone (PEEK) are conceivable for particularly demanding applications.

As reinforcing fibres 13 of the continuous fibre strands 3, in preference glass, for demanding applications also carbon or aramide are utilized, while for the long-fibre reinforcement 12 in most instances cost-effective glass fibres are sufficient With the continuous fibre strands of the supporting structure 4, the high mechanical properties of the structural components are achieved, while the long-fibre reinforcement 2 provides a shaping-and supporting function. In this it is essential, that between the continuous fibre strands and the long-fibre reinforcement a very good contact and a good load transmission is achieved, for which the long-fibre reinforcement should also have a sufficiently high fibre content, in order with this to also minimize the differences in the thermal expansion. The reinforcement of the long-fibre matrix should therefore have a fibre content of at least 10% by volume, in preference 15 to 25% by volume. While the continuous fibre strands 3 have a fibre content of at least 40% by volume, in preference of 45 to 60% by volume.

Figure 4:
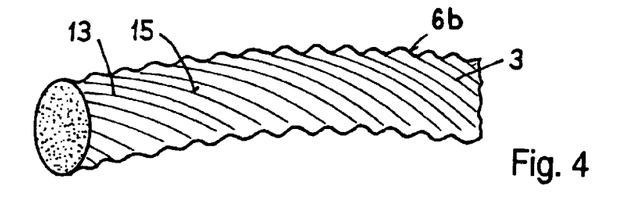
Figure 5:
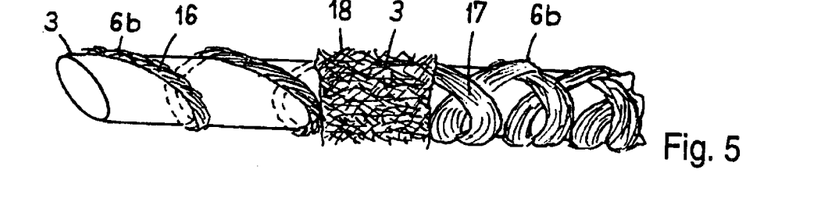

In order to be in a position, dependent on the laying paths 39 (FIG. 13), to bend and also if so required to shape the continuous fibre strands, these are in preference twisted in accordance with FIG. 4. In order to hold them together well also during pressing, the continuous fibre strands 3 can also be wrapped (16 in FIG. 5) or enveloped by a braided tube 17. With this, also a structured, enlarged connecting layer 6a with shapings can be achieved. A further advantageous improvement of the contact can be obtained with needle-bonding 18, in the case of which fibre ends protrude from the strands 3 in all directions and therefore reach into the re-melted long-fibre mass 2. FIG. 4 illustrates a round-, FIG. 5 a flat cross section. The continuous fibre strands 3 have to a greater extent longitudinally oriented continuous fibres, which are fully impregnated with matrix material, compacted and consolidated. During the manufacture of the consolidated continuous fibre strands, the twisting can also be carried out with differing strengths, depending on whether during the laying on the laying path greater or smaller bends occur, i.e., a continuous fibre strand can in the zone of greater bending have a correspondingly stronger twisting and in zones with weaker bending a very low twisting. If no lateral bends occur, it is also possible to utilize flat strands without any twisting, i.e., in essence UD strands.

Figure 6A:
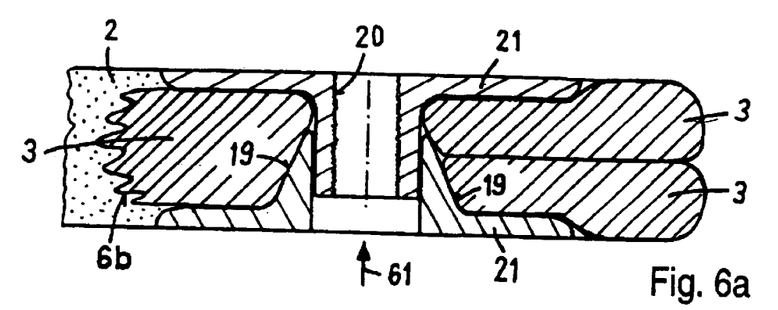
Figure 6B:
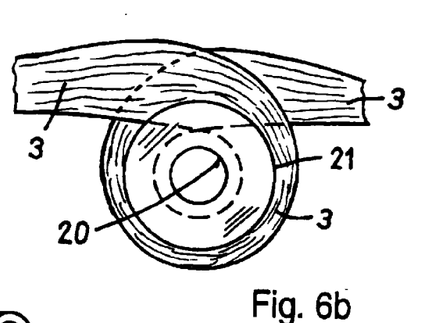
Figure 15:
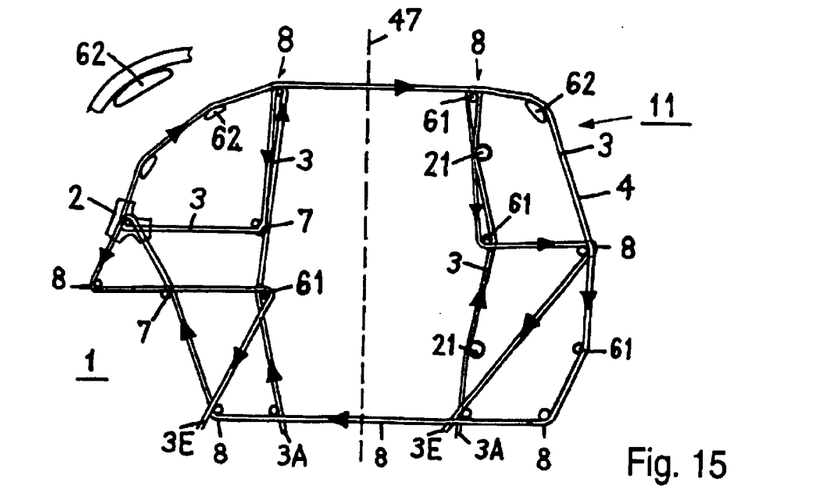

The long-fibre reinforcement produced by extrusion in preference has greater fibre lengths than is possible in the case of injection moulding. To achieve this, a great proportion of the fibres should have a length of at least 5 mm, whereby preferably the fibre length to a great extent can lie within a range of 10 to 30 mm. Important is an impeccable impregnation, mixing and consolidation also of the long-fibre reinforcement Since the plastified continuous fibre strands 3 during laying can be moved and re-shaped in any direction, in a simple manner also load-bearing inserts 21, as depicted in FIG. 6, can be joined to the continuous fibre strands, resp., enveloped by them. With this, load-bearing elements, e.g., fixing elements, such as safety belt anchor points in vehicle cabins, can be manufactured (FIG. 15).

FIG. 6a in cross section and FIG. 6b from above show an example of a two-part insert 21, which by the closing of the mould is pressed together to the required position and as a result by means of a corresponding flank 19 can in addition also tension the continuous fibre strands 3 in a defined manner. In the insert, a screw thread 20 is attached. On the right side in FIG. 6a lies the overlap of the continuous fibre strand 3, which here is correspondingly pressed together and deformed to a greater extent.

Figure 7:
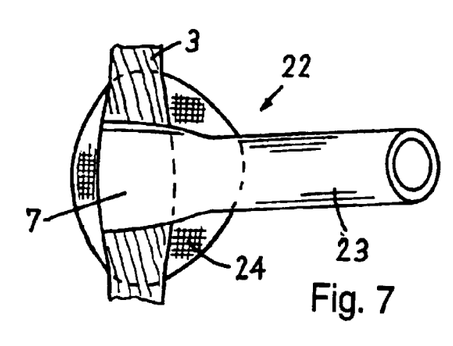

Depending on the requirements of the structural component, apart from inserts also other inlays can be incorporated, as is illustrated in FIG. 7. Here, for example, a high-strength continuous fibre strand-reinforced tubular profile component 23 with a flattened end is connected to a continuous fibre strand 3, whereby here in addition a local continuous fibre strand fabric inlay 24 supports the load introduction. Important is always the impeccable thermoplastic connection of the elements.

Figure 8:
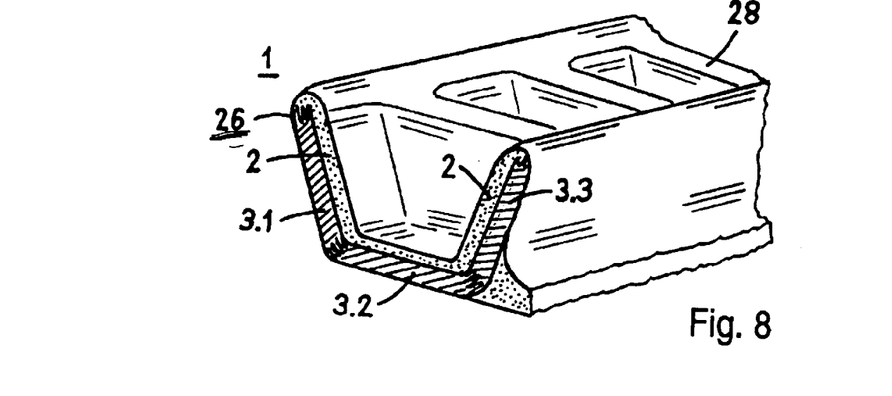
Figure 9:
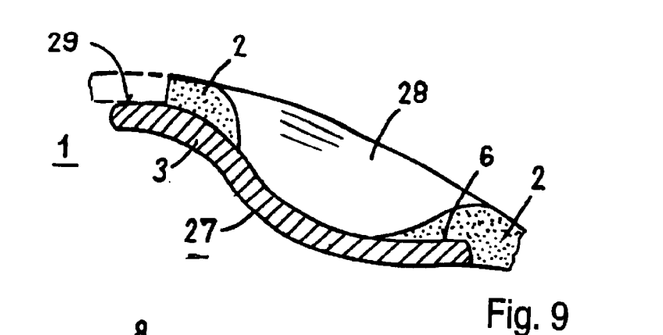

The wide-ranging design-and shaping possibilities of the structural components in accordance with the invention are illustrated in the FIGS. 8 and 9, which form three-dimensional "profile cross sections" 26, 27. FIG. 8 in doing so shows a slightly open U-profile composed of three continuous fibre strands 3.1–3.3, which is connected with the long-fibre mass 2 through a ribbing 28.

FIG. 9 illustrates, for example, a section through a frame girder 27 of a vehicle cabin, which contains a flange 29 for receiving a window pane and which in turn has strengthening ribs 28 in combination with the load-bearing profiled, flat continuous fibre strands 3.

Figure 10:
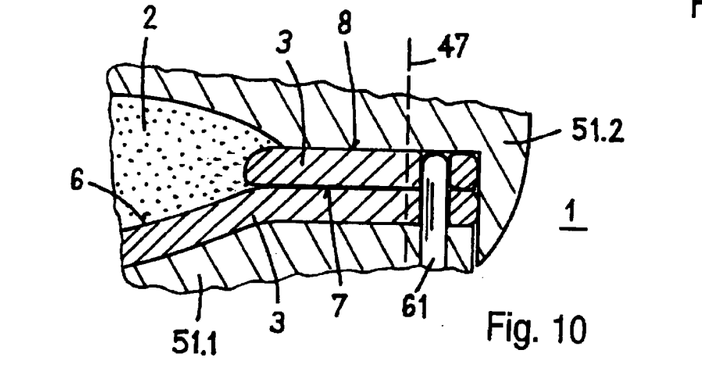
Figure 19A:
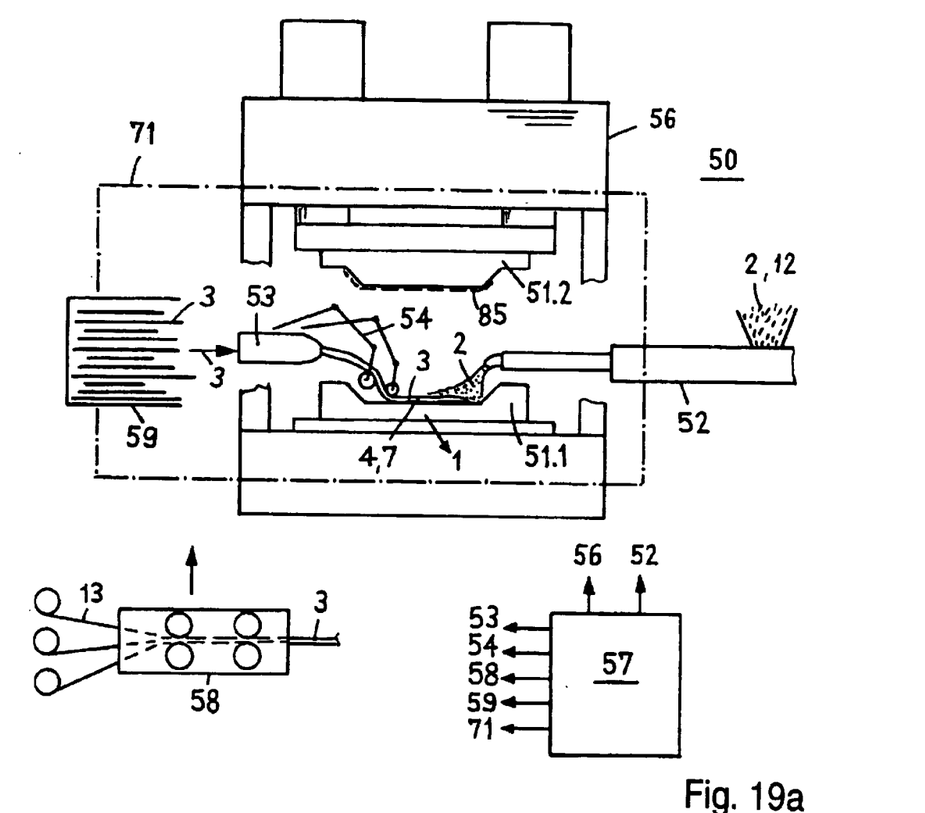

Advantageously and depending on the application, open external connecting areas 8 can be formed on the structural components, which consist of continuous fibre strands, in order by means of this to assure the best possible load introduction into the structural component, as is illustrated in the example of FIG. 10 by corresponding form tool components 51.1, 51.2 (refer to FIG. 19). With this, structural bodies 90 can be assembled out of several individual structural components 1 to a great extent in any desired manner, in that these structural components are connected to one another at external connecting areas 8, which are preferably formed out of continuous fibre strands. This in preference can be accomplished by welding or if need by also by glueing. In analogy to the internal connecting areas 7, these external connecting areas 8 too are preferably designed with a large surface area.

Figure 11:
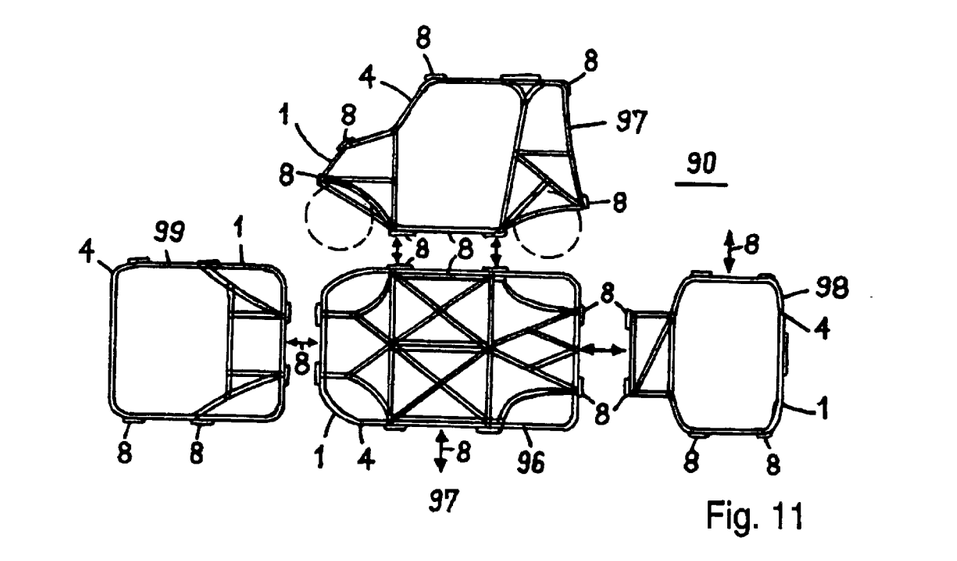

The example of FIG. 11 shows a vehicle cabin, which is composed of a floor group 96, two side walls 97, a rear part 98 and a front part 99 by connecting the areas 8.

Figures 12, 13, 14:
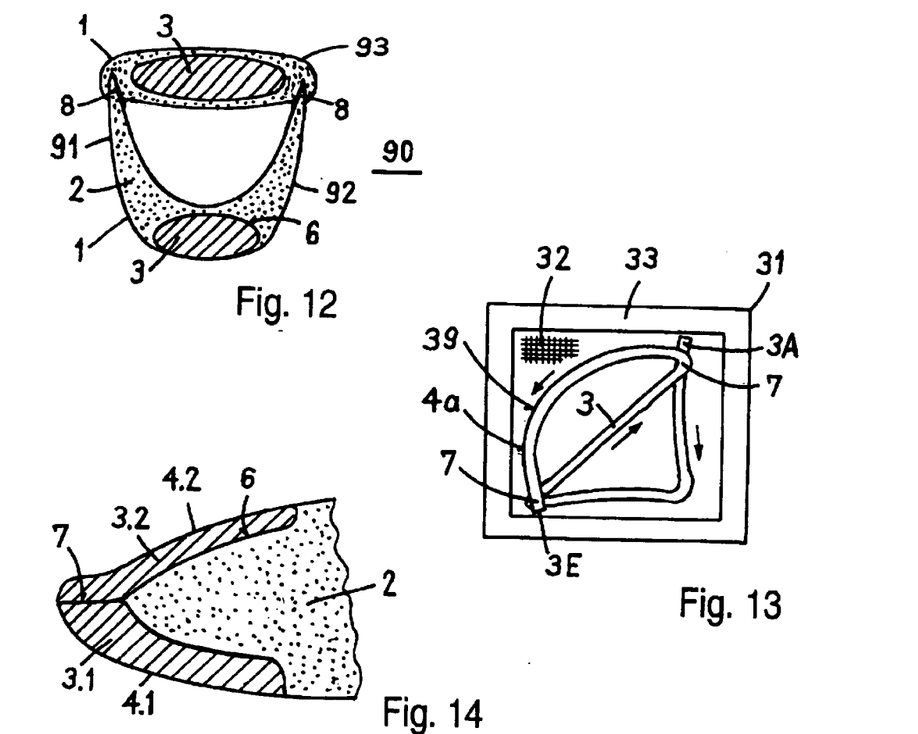

FIG. 12 illustrates a further example of a structural body, which is composed of two structural components 1, here designed as half shells: a U-profile 92 and a cover 93, which together form the hollow profile support 91 with differing cross-sectional shapes of the CF strands 3.

The following method is suitable for manufacturing structural components in accordance with the invention, which can, e.g., be carried out with an installation as illustrated in FIG. 19:

A plastified, long-fibre-reinforced plastic mass is deposited corresponding-to-form in an open, two-part form tool 51.1, 51.2 in a press, whereby in the same cycle with a laying device 54 consolidated, plastified continuous fibre strands 3 are laid into the form tool before and/or after the long-fibre-reinforced mass locally defined along predefined laying paths 39 and held in position by means of fixing means 40 to such an extent, that with the pressing and closing of the form tool 51 a desired supporting structure 4 of the continuous fibre strands 3 is created and whereby with the pressing above all simultaneously also an impeccable thermoplastic connection between the long-fibre mass 2 and the continuous fibre strands 3 is produced at the interface 6.

In doing so, in preference first the continuous fibre strands 3 are laid in the lower form tool 51.1 and subsequently the long-fibre-reinforced mass 2 is fed into it, whereupon then the pressing takes place.

Figure 19B:
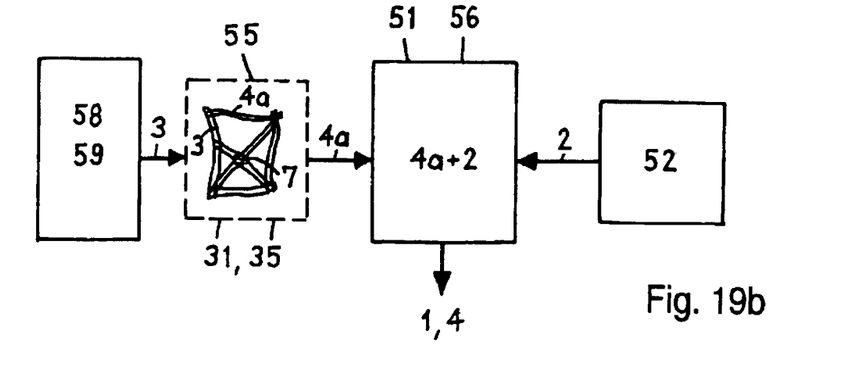

In another variant of the manufacturing method, the continuous fibre strands 3 can be laid on a transport mesh or grid 31 for the formation of a preformed supporting structure 4a, fixed onto it and subsequently transferred to the open form tool 51 (refer to FIG. 19b). Here the laying of the continuous fibre strands 3 and the feeding-in of the long-fibre mass into the form can take place side by side and simultaneously, as a result of which shorter manufacturing cycles can be achieved. FIG. 13 shows such a transport mesh 31 for laying the continuous fibre strands onto a inlay mesh 32 in a transfer frame 33 for the transfer to the press. The inlay mesh can consist of a coarse meshed textile mesh (e.g., with a mesh width of 4 to 10 mm) and can remain in the structural component after the pressing. The transfer frame 33 is then equipped with a new inlay mesh 32 for the new cycle. By melting the continuous fibre strands into the inlay mesh, a very good fixation corresponding to the required laying path 39 can be obtained.

Utilized as flexible inlay meshes can be, e.g. also fibreglass meshes. By pressing onto the form tool 51, the desired three-dimensional shape of the supporting structure 4a, 4 can be achieved. It is also possible, however, to utilize light, non-deformable metallic wire meshes, with which a three-dimensionally preformed supporting structure 4a can be produced. The transport meshes 31 can also only cover partial areas, in which the laying paths 39 of the continuous fibre strands 3 lie. A further variant consists in the laying of the preformed supporting structure 4a onto a heated auxiliary mould 35 outside the press, as is explained in connection with FIG. 19b.

FIG. 14 shows a structural component with two layers of continuous fibre strands 3.1 and 3.2, which correspond to partial structures 4.1 and 4.2. This can be manufactured by first laying the continuous fibre strands 3.1 in the lower mould half 51.1, subsequently feeding-in the long-fibre mass 2 and carrying out a first pressing. Then the form tool and the press are opened again and a laying path on the long-fibre mass 2 for a second layer of continuous fibre strands 3.2 is superficially melted open by local heating, whereupon a second layer of continuous fibre strands 3.2 is laid, subsequently pressed and in doing so thermoplastically connected with the long-fibre mass 2. This melting open can, e.g., be effected by means of an IR heating to such an extent, that a complete thermoplastic connection is achieved.

FIG. 15, as an example, schematically illustrates the laying of continuous fibre strands along a laying path 39 as a structural component for a vehicle side wall, which here form a framework-like supporting structure 11. The CF strands 3 are here fixed by means of fixing pins 61, deviating elements 62 and also inserts 21 (here as safety belt anchor points) onto the laying path 39 (also refer to FIGS. 6 and 18). In doing so, one or several strands 3, in part also in double or multiple routing can be laid with internal connecting areas 7.

Figure 16:
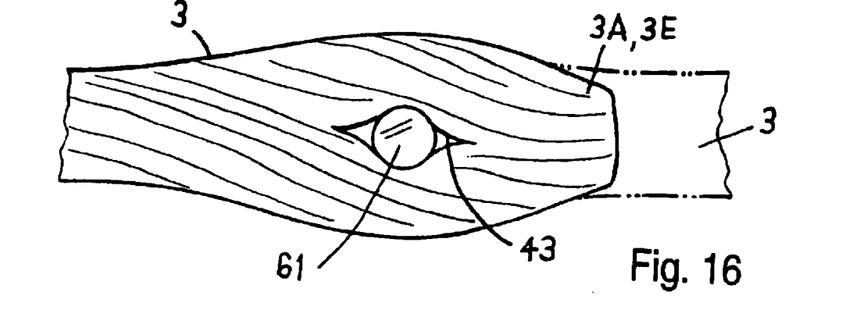
Figure 17:
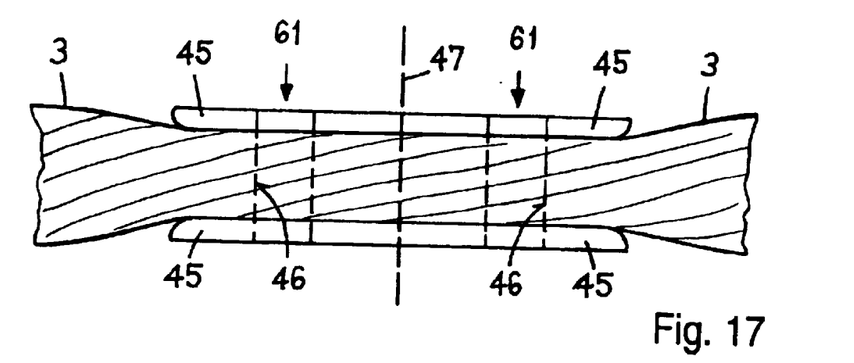

The laying and fixation of the continuous fibre strands 3 can, e.g., be carried out in the following manners:

in that first the beginning 3A of a continuous fibre strand is fixed to the tool 51 and subsequently laid under slight tension, and its end 3E once again, while maintaining an appropriate tension, is fixed to the form tool 51, in that the continuous fibre strand 3 is pressed onto the form by the laying device 54 with such dosing, that the strand lies flat and assumes the desired position and cross-sectional shape in the form tool 51 (FIG. 22), in that the continuous fibre strand 3 at least in part, i.e., at the beginning 3A, at direction changes of the laying path and at the end 3E is melted onto the mould (41 in FIG. 21), in that the continuous fibre strands 3 through contact with the cooler form tool 51 are solidified to such an extent, that they remain fixed to the form tool during the pressing and that they, however, in doing so on the other hand at their contact surfaces 6 again fully fuse together with the long-fibre mass 2, which has been filled-in in hot condition, in that in molten condition at the beginning 3A and end 3E of a continuous fibre strand eyes 43 are melted in by pressing and partial solidifying (FIG. 16) and whereby these shaped ends 3A, 3E after the laying of the continuous fibre strand 3 are superficially melted open again by the hot long-fibre molten mass and thermoplastically connected and in that at the ends 3A, 3E of the melted-open continuous fibre strands holding elements 45 with plug-in holes 46 are melted open, which after the laying of the long-fibre mass 2 fuse together with it (FIG. 17).

FIG. 16 shows an end 3a or 3E of a continuous fibre strand, into which in molten condition an eye 43 has been formed, which in the again solidified condition can be plugged into a fixing pin 61 of the form tool for laying.

FIG. 17 shows holding elements 45, which at ends 3A, 3E of the continuous fibre strands are melted on and in which plug-in holes 46 for the fixation to fixing pins 61 are punched. In the example illustrated, two holding elements are produced by punching along the cutting line 47. The holding elements 45 in preference consist of the same material as the continuous fibre strands 3.

The eyes 43 and the holding elements 45 can also be arranged within the continuous fibre strands 3.

Figure 18:
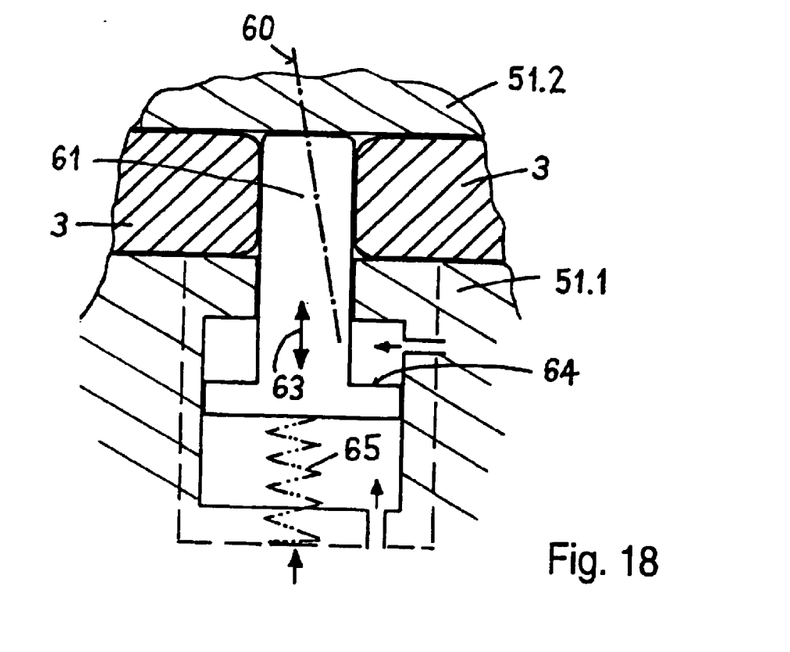

Also in the installation (FIG. 19), means of fixation are foreseen for fixing the continuous fibre strands in the desired final position during the manufacturing process. As shown in FIG. 18, to achieve this it is also possible to insert fixing pins 61 or deviating elements 62 (FIGS. 2, 15) for the continuous fibre strands, which are located on the bottom part of the form tool 51.1.

These fixing pins 61 and deviating elements 62 can also be designed to be movable (63) and be pressed upwards under an appropriately selected pre-tension. When the press is closed, the fixing pin is then pushed downwards through the upper part 51.2 of the form tool. This movement of the fixing pins 61 can also be effected by means of a controlled drive 64, e.g., electrically or in the form of a hydraulic piston, which can also be utilized for the removal from the mould. The fixing pins 61 can also be affixed outside the structural component to be manufactured, but still inside the form tool. The protruding part can then be cut off after the manufacture (refer to cutting lines 47 in FIGS. 3 and 10).

By an inclined displacement axis 60 during pressing and compression a tensioning effect can also be atteined (as shown in the example of FIG. 6a).

FIG. 19a depicts an installation for the manufacturing of structural components with a long-fibre plastifying-and feeding-in device 52, a two-part form tool 51.1, 51.2 in a press 56 and with a continuous fibre strand plastifying device 53, which has an assigned laying device 54, as well as with a control system 57 for the time-co-ordinated controlling of the movement of the components of the installation and for temperature-conditioning, for laying the continuous fibre strands 3 and for the corresponding-to-form feeding-in of the long-fibre molten mass 2 as well as for the thermoplastic connecting of continuous fibre strands 3 and long-fibre matrix 2.

While in the installation according to FIG. 19a the preformed supporting structure 4a is directly laid and formed by the laying device 54 in the tool 51, FIG. 19a as a variant illustrates the formation of the preformed supporting structure 4 outside the press with subsequent transfer into the tool 51 in the press 56 by means of a transfer device 55. To accomplish this, the preformed supporting structure 4a made out of the plastified continuous fibre strands 3 is laid onto an auxiliary mould 35 or onto a suitable substrate, after a slight cooling down to below the melting point, so that an adequate non-deformability is obtained, transferred into the tool 51, there heated up again to such an extent, that with the subsequent filling-in of the hot long-fibre mass 2 and with the pressing a complete thermoplastic connection is produced at the interfaces 6 between the continuous fibre structure 4 and the long-fibre mass 2. Or the preformed supporting structure 4a is laid onto a transport mesh 31 (FIG. 13) and transferred into the press with it. Suitable process temperatures for the materials polypropylene-glass are, for example: for a non-deformable transfer 140°–150° C., for the hot long-fibre mass 230°–250° C. and for the interfaces 6 during pressing at least 200° C.

Figure 24A:
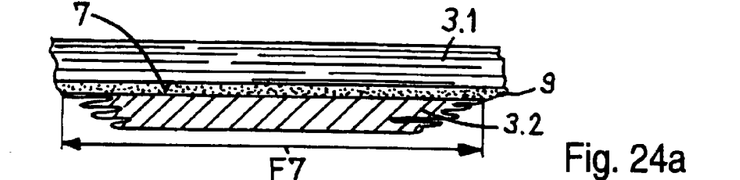
Figure 24B:
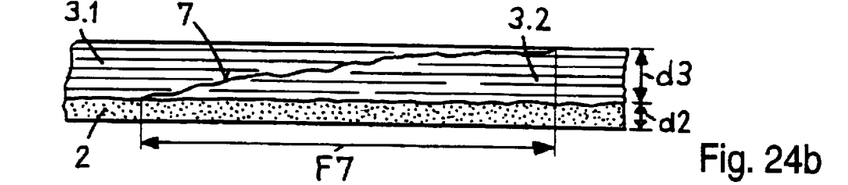
Figures 24C, 25:
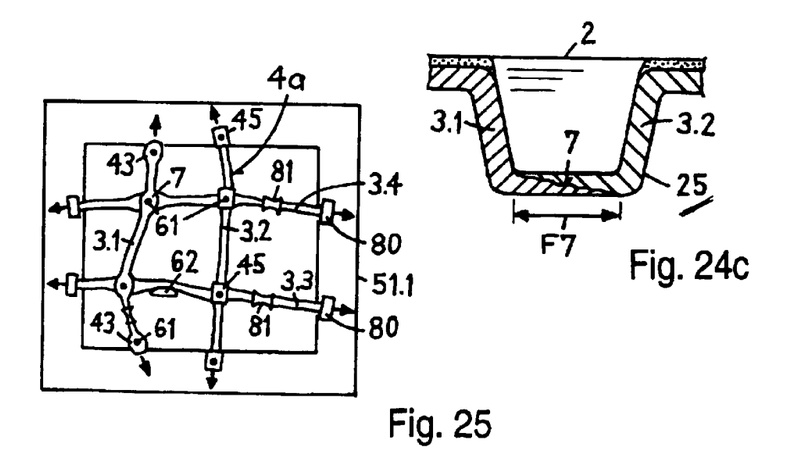

FIG. 25 illustrates various examples of fixing-and tensioning elements, with which a preformed supporting structure 4a made out of continuous fibre strands 3.1 to 3.4 is fixed and held within the tool 51 during the pressing, so that following the pressing the desired finished integrated supporting structure 4 in the long-fibre matrix results. To achieve this, here on the lower form tool 51.1 various fixing elements 61, holding elements 45, deviating elements 62 and tensioning elements 80 are attached. Also clamping elements 81, e.g., made of aluminium sheet metal, which are pressed together by the pressing, can be utilized for holding the continuous fibre strands together. With this method, in addition simultaneously also, e.g., decorative surfaces 85 (FIG. 19a) can be affixed to one side of the structural component 1 (e.g., for a tailgate 95 in accordance with FIG. 2). On the other side the continuous fibre strands 3, resp., the supporting structure 4 are integrated. By means of such two-side inlays or supports of a flat surface structural component, the thermal distortion can be essentially reduced.

Figure 20A:
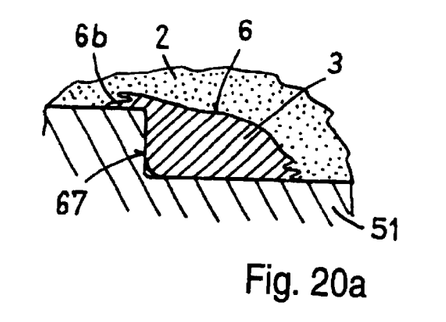
Figure 20B:
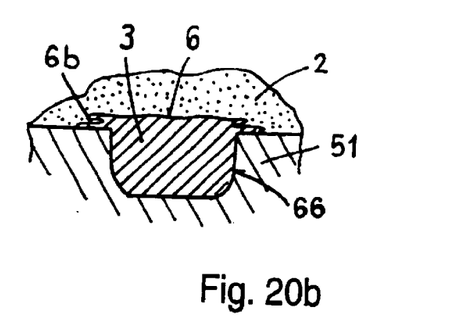
Figure 21:
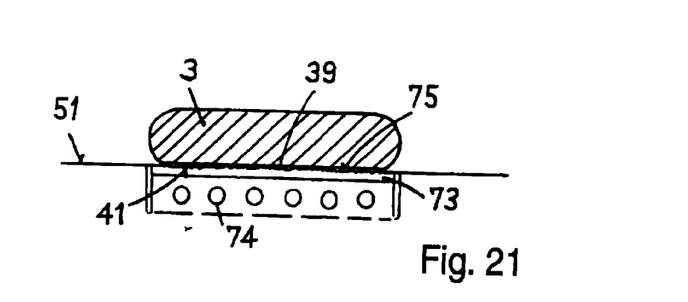
Figure 22A:
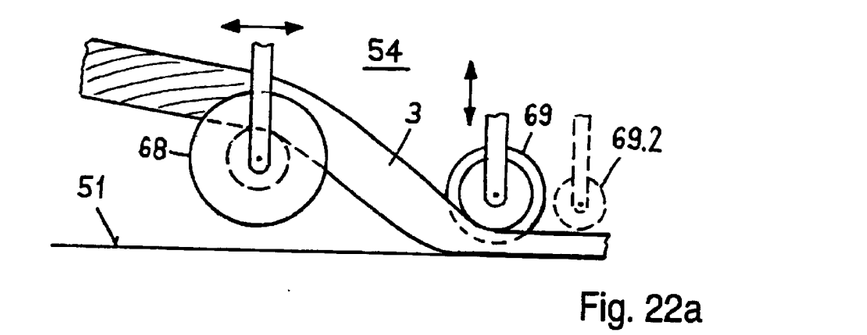
Figure 22B:
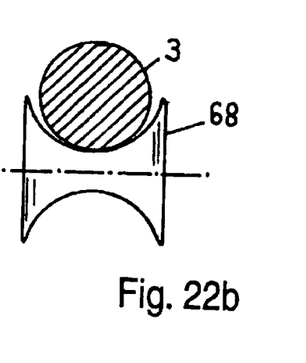
Figure 22C:
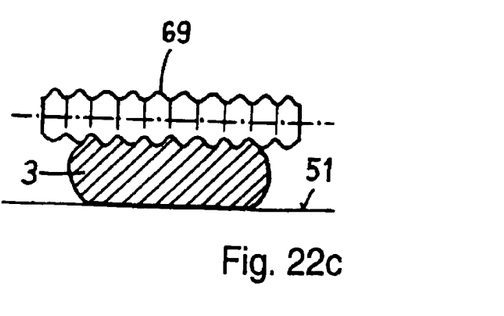

The FIGS. 20 to 22 show further guiding-and fixing means of the installation. In FIG. 20a, b shapings in the form tool 51 are depicted, e.g., like steps 67 in FIG. 20a and channels 66 in FIG. 20b, into which the continuous fibre strands are laid and during the pressing are held in place, i.e., on the predefined laying path 39.

FIG. 21 illustrates a thermal conditioning on the laying path 39, resp., at the shapings like channels and steps. This can, e.g., consist of a thermal insulating layer 73, which reduces the cooling down of the continuous fibre strand. Also a thermal conditioning 74 can be appropriate, with which the continuous fibre strand 3 depending on the process step can be heated or cooled. A structuring 75 of the surface, if intended, can also reinforce a local fixation of the CF strands 3 on the form tool 51.

The FIGS. 22a to c show guiding-and pressing-on means of the laying device 54. A continuous fibre strand here is guided by guiding rollers 68 on the laying path and by a pressure roller 69 by means of a corresponding control system is deformed and pressed on to such an extent, that on the one hand the desired cross-sectional shape is produced and that on the other hand the continuous fibre strand is also pressed onto the form tool 51 and fixed. The laying device 54 can also have two or more pressure rollers (69.2), which can be changed during the laying, in order to by means of this achieve differing shapes, e.g., at connecting areas 7.

The installation can also be assigned a consolidating device 58 for the continuous fibre strands. The manufacturing of it can be effected, e.g., out of continuous fibre rovings, which are impregnated with matrix material and compacted and consolidated with a suitable torsion. Or else it is also possible to carry out a re-forming of UD (uni-directional) tapes.

A further variant of the installation comprises a store 59 for the continuous fibre strands, from which the cut-to-length and consolidated strands 3 are taken, completely melted open and laid. In doing so, in preference the continuous fibre strands in the store 59 are preheated to almost their softening temperature.

If so required, a heating gas-or protective gas conditioning facility 71 can also be foreseen in the installation, in order to on the one hand prevent any oxidizing of the matrix materials and on the other hand to locally dosed heat, resp., cool continuous fibre strands and laying paths 39 in accordance with the process steps.

Figure 23A:
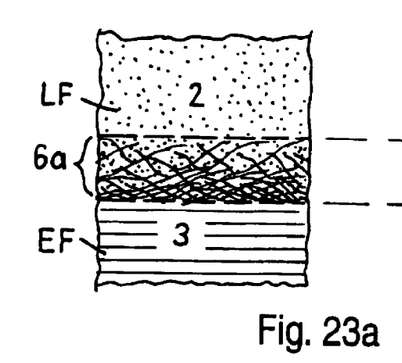
Figure 23B:
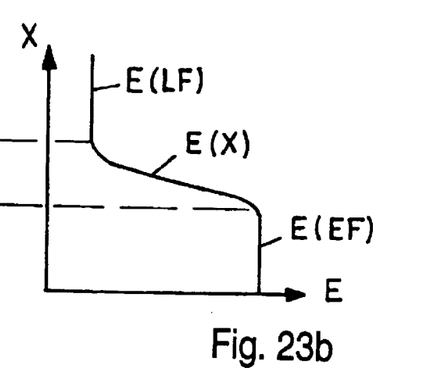

The FIGS. 23 illustrate optimum connections at the interface 6 between continuous fibre strands and long-fibre matrix. FIG. 23a shows an interface 6, which is designed as connecting layer 6a and which can have a layer thickness d of less than 1 mm, e.g., 0.1 to 0.5 mm. This connecting layer is formed by a mixing-or transition zone, in that the continuous fibre proportion reduces and the long-fibre proportion increases, with which a particularly good thermoplastic connection between continuous fibre strands 3 and long-fibre mass 2 can be achieved. Such connecting-or mixing layers 6a, e.g., can be produced by roughening, needle-bonding or structured surfaces of the continuous fibre strands with protruding fibres. With this, a close contact of fibre mixture of continuous fibre strands and long-fibre layer is achieved and with it a corresponding balanced transition of the mechanical properties without any sudden changes. This is illustrated in FIG. 23b, which shows the course of the modulus of elasticity (in EF-direction) in the transition zone. Along the layer thickness d, the modulus of elasticity here continuously reduces from the high value of the continuous fibre strand 3 to the several times lower value of the long-fibre mass 2.

The FIGS. 24a, b, c illustrate examples of good load transfers at internal connecting areas 7 between two continuous fibre strands 3.1, 3.2. In FIG. 24a, between two crossing continuous fibre strands a thin intermediate layer 9 of long-fibre material is built-in, which helps to prevent harmful pockets of air, inasmuch as during the pressing any possible pockets of air can be relatively well guided out through the long-fibre mass. In addition, this connecting area F7 too is designed to have a relatively large surface area. In FIG. 24b, two continuous fibre strands 3.1, 3.2 are longitudinally connected together through an extensive connecting area F7, which in addition is widened approximately 2 times and which can also be structured, resp., shaped for the purpose of enlarging the mutual contact surface area. Over and above this it is advantageous, if the layer thickness d3 of the continuous fibre strands 3 is at least as great as the layer thickness d2 of the long-fibre matrix 2 situated above it. FIG. 24c shows an example of a three-dimensional U-shaped profile with flanges, which is composed of two continuous fibre strands (here as flat tapes 3.1, 3.2) at a connecting area 7. Also this load-transmitting connecting area 7 is designed with a large surface area (F7). Complemented by a ribbing made of long-fibre mass in between, this results in a profile resistant against bending.

In summary, when laying the continuous fibre strands and in order to form the supporting structure with internal load-transmitting connecting areas, the following important criteria have to be fulfilled:

a) The continuous fibre strands have to be laid defined with respect to position on a laying path and b) in the desired cross-sectional shape;

c) they must not be inadmissibly displaced or deformed during pressing, so that in the final condition after the pressing the supporting structure 4 is present in the desired position and cross-sectional shape;

d) in the final condition they have to be fused together with the long-fibre mass at the interfaces 6 as well as e) with the supporting structures 4 at the internal connecting areas 7 in a load-transmitting manner.

The following means can, for example, be utilized, in order to fulfil these criteria:

Fix the continuous fibre strands at their beginning 3A and along the laying path at those points necessary, fix and tension them at deviating means and fixing pins with respect to their shape;

fix them on the floor of the tool by pressing-on and melting;

by means of a corresponding shaping of the tool with channels and steps, hold the laid continuous fibre strands firm against displacement;

feed-in and distribute the long-fibre masses in such a manner, that during pressing only minimal flow paths of the long-fibre mass occur on the laying paths of the continuous fibre strands;

feed-in a preformed supporting structure 4a, fix it and with the pressing of the tool form correspondingly bring it to the final shape 4;

process control and thermal conditioning of the continuous fibre strands in such a manner, that their surface during pressing fuses together as interface with the long-fibre mass.

With this, in a simple and cost effective manner in short cycles light and stable load-bearing structural components, i.e., light-weight structural components with a to a great extent free shaping can be manufactured.

Within the scope of this description, the following designations are used:

| | |
|---|---|
| 1 | Structural component |
| 2 | Long-fibre matrix |
| 3 | Continuous fibre strands |
| 3A | Beginning of 3 |
| 3E | End of 3 |
| 4 | Supporting structure |
| 4.1, 4.2 | Partial structures |
| 4a | Preformed supporting structure |
| 6 | Interface |
| 6a | Connecting layer |
| 6b | Structured interface |
| 7 | Internal connecting areas |
| 8 | External connecting areas |
| 9 | Thin intermediate layer |
| 10 | Mesh |
| 11 | Framework(-like) |
| 12 | Long-fibre reinforcement (LF) |
| 13 | Continuous fibres (CF) |
| 15 | CF twisted |
| 16 | CF wrapped |
| 17 | CF braided |
| 18 | Needle-bonded |
| 19 | Flank, rising |
| 20 | Screw thread |
| 21 | Insert, load-bearing |
| 22 | Inlays |
| 23 | Tubular profile part |

-continued

| | |
|---|---|
| 24 | Fabric inlay |
| 25, 26, 27 | Three-dimensional (spatial) profile sections |
| 28 | Ribs |
| 29 | Flange |
| 31 | Transport mesh |
| 32 | Inlay mesh |
| 33 | Transfer frame |
| 35 | Auxiliary mould |
| 39 | Laying paths |
| 41 | Melt |
| 43 | Eyes on 3 |
| 45 | Holding elements |
| 46 | Plug-in holes |
| 47 | Cutting, cutting lines |
| 50 | Installation |
| 51 | Form tool |
| 51.1, 51.2 | Lower -, upper mould half |
| 52 | LF plastifying and feeding device |
| 53 | CF plastifying device |
| 54 | Laying device |
| 55 | Transfer device |
| 56 | Press |
| 57 | Control system |
| 58 | CF consolidation device |
| 59 | CF strand store |
| 60 | Inclined displacement axis |
| 61 | Fixing pins |
| 62 | Deviating elements |
| 63 | Movable |
| 64 | Controlled drive |
| 65 | Pre-tension |
| 66 | Channels in 51 |
| 67 | Steps |
| 68 | Guide rollers |
| 69 | Pressure rollers |
| 71 | Protective gas/heating gas conditioning |
| 73 | Insulation |
| 74 | Thermal conditioning |
| 75 | Structured surface |
| 80 | Tensioning elements |
| 81 | Clamping elements |
| 85 | Decorative material |
| 90 | Structural body |
| 91 | Hollow profile girder |
| 92 | U-profile with ribs |
| 93 | Cover |
| 95 | Tailgate |
| 96 | Floor group |
| 97 | Side walls |
| 98 | Rear part |
| 99 | Front part |
| CF | Continuous fibre |
| LF | Long-fibre |
| E | Modulus of elasticity |
| d | Thickness of 6a |
| d2 | Thickness of 2 |
| d3 | Thickness of 3 |
| F7 | Large surface area 7 |

What is claimed is:

1. A structural component of fiber-reinforced thermoplastic material comprising:

a shape-forming long-fiber-reinforced thermoplastic matrix and separate, single load-bearing plastified and consolidated continuous fiber strands with a thermoplastic matrix in a defined position within the structural component, the positions of the shape-forming long-fiber-reinforced thermoplastic matrix and the separate, single load-bearing plastified and consolidated continuous fiber strands with a thermoplastic matrix defining interfaces therebetween;

said continuous fiber strands being interconnected and having at least one load-transmitting flat internal connecting area between two continuous fiber strands;

wherein the single continuous fiber strands form a load-bearing supporting structure which is integrated in and thermoplastically bonded to the long-fiber-reinforced thermoplastic matrix at the interfaces therebetween.

2. The structural component in accordance with claim 1, wherein the interfaces are designed as connecting layers, which form a transition zone between long-fiber matrix and continuous fiber strands.

3. The structural component in accordance with claim 1, wherein the interfaces are designed as structured interfaces having uneven shapings.

4. The structural component in accordance with claim 1, wherein the continuous fiber strands of the supporting structure form at least one closed mesh.

5. The structural component in accordance with claim 1, wherein the continuous fiber strands run in different directions and are thermoplastically bonded together at internal load-transmitting connecting areas in the manner of a framework.

6. The structural component in accordance with claim 1, wherein the matrix material of the long-fiber reinforcement and of the continuous fiber strands are identical.

7. The structural component in accordance with claim 1, wherein the matrices of the long-fiber-reinforcement and of the continuous fiber strands consist of polypropylene, polyamide, polyethylenetherephtalate, polybutylenetherephtalate, thermoplastic polyurethanes, polycarbonate, polyacrylics, polyimide, polyphenylsulphide or polyetheretherketone and that the reinforcing fibers of the continuous fiber strands consist of glass, carbon or aramide and the long-fiber reinforcement consists of glass.

8. The structural component in accordance with claim 1, wherein the reinforcement of the long-fiber matrix has a fiber content of 15–25% by volume and that the continuous fiber strands have a fiber content of at least 40% by volume.

9. The structural component in accordance with claim 1, wherein the continuous fiber strands are twisted.

10. The structural component in accordance with claim 1, wherein the continuous fiber strands are needle-bonded, wrapped or enveloped by a braided tube.

11. The structural component in accordance with claim 1, wherein the long-fiber reinforcement has a great proportion of fibers with a length of at least 5 mm.

12. The structural component in accordance with claim 1, wherein load-bearing inserts are integrated, which are directly connected with the continuous fiber strands.

13. The structural component in accordance with claim 1, wherein further inlays are integrated, e.g., high-strength continuous fiber-reinforced tubular profile parts and/or local continuous fiber fabric inlays, which are connected with the continuous fiber strands and fused together with the long-fiber matrix.

14. The structural component in accordance with claim 1, wherein the continuous fiber strands form "three-dimensional" profile cross sections.

15. The structural component in accordance with claim 1, wherein external connecting areas of the continuous fiber strands are foreseen.

16. The structural component in accordance with claim 1, wherein the layer thickness of the continuous fiber strands is at least as large as the layer thickness of the long-fiber matrix located above it.

17. The structural component in accordance with claim 1, wherein the load-transmitting connecting areas are designed with a large surface area.

18. The structural component in accordance with claim 1, wherein the connecting areas have a thin long-fiber intermediate layer.

19. The structural body consisting of at least two structural components in accordance with claim 1, which structural components are connected to one another at external connecting areas of the continuous fiber strands.

20. The structural body with at least two structural components in accordance with claim 1, which are designed as half-shells and arm connected to one another and form a hollow profile girder.

21. A structural component of fiber-reinforced thermoplastic material comprising:

a shape-forming, long-fiber-reinforced thermoplastic matrix and separate, single load-bearing plastified and consolidated continuous fiber strands with a thermoplastic matrix, each in a defined position within the structural component, the positions of the shape-forming long-fiber-reinforced thermoplastic matrix and the separate, single load-bearing plastified and consolidated continuous fiber strand with a thermoplastic matrix defining interfaces there between;

said continuous fiber strands being interconnected and having at least one load-transmitting flat internal connecting area between two separate, single load-bearing continuous fiber strands and where the separate, single load-bearing continuous fiber strands are forming a load-bearing supporting structure which is integrated in and thermoplastically bonded to the long-fiber-reinforced thermoplastic matrix at the interfaces therebetween.

* * * * *